US012688297B2

(12) United States Patent
Gulati et al.

(10) Patent No.: US 12,688,297 B2
(45) Date of Patent: Jul. 21, 2026

(54) APPLICATION INTEGRATION SYSTEM AND METHOD

(71) Applicant: Microsoft Technology Licensing, LLC, Redmond, WA (US)

(72) Inventors: Siddharth Gulati, Kirkland, WA (US); John Giang Nguyen, Duvall, WA (US); Graham Lee Mcmynn, Redmond, WA (US); Aninda Ray, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

(21) Appl. No.: 18/906,892

(22) Filed: Oct. 4, 2024

(65) Prior Publication Data

US 2026/0099607 A1 Apr. 9, 2026

(51) Int. Cl.
*G06F 21/57* (2013.01)
*G06F 9/54* (2006.01)

(52) U.S. Cl.
CPC ............ *G06F 21/575* (2013.01); *G06F 9/547* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 6,810,410 | B1 * | 10/2004 | Durham | ............... G06F 40/174 |
| | | | | 709/219 |
| 2002/0152228 | A1 * | 10/2002 | Lopez | ................. G06F 11/1438 |
| 2011/0010612 | A1 * | 1/2011 | Thorpe | ................. G06F 16/957 |
| | | | | 718/100 |

FOREIGN PATENT DOCUMENTS

WO    WO-2012042509 A1 *   4/2012   ........... G06F 3/0604

* cited by examiner

*Primary Examiner* — Paul R Fisher
(74) *Attorney, Agent, or Firm* — Han Gim; Newport IP, LLC

(57) ABSTRACT

A data processing system for a cloud-based collaboration and communication application receives a call to a first application programming interface (API) at a collaboration and communication service from a client application during a boot process for the client application. The first API call indicates that a web uniform resource locator (URL) and valid domains for a tenancy are being requested. A call to a second API for a content and information management service is generated that requests site collection information for the tenancy. The site collection information us received and a site list for the tenancy is generated using the collaboration and communication service. A first site in the site list is the web URL of the root site and remaining sites in the site list are the valid domains for each instance of the tenancy.

20 Claims, 6 Drawing Sheets

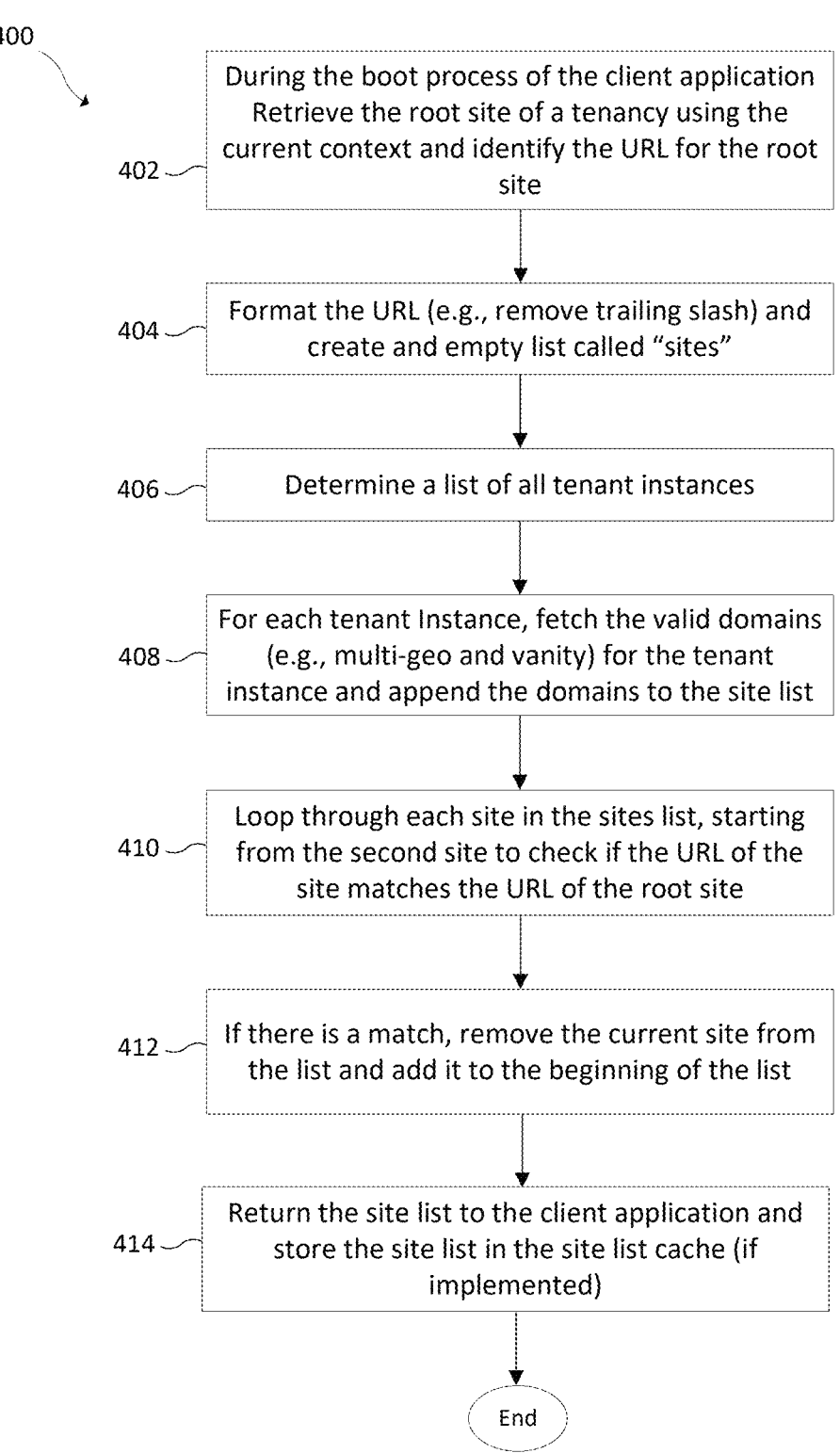

400

402 — During the boot process of the client application Retrieve the root site of a tenancy using the current context and identify the URL for the root site 404 — Format the URL (e.g., remove trailing slash) and create and empty list called "sites"

406 — Determine a list of all tenant instances

408 — For each tenant Instance, fetch the valid domains (e.g., multi-geo and vanity) for the tenant instance and append the domains to the site list 410 — Loop through each site in the sites list, starting from the second site to check if the URL of the site matches the URL of the root site 412 — If there is a match, remove the current site from the list and add it to the beginning of the list 414 — Return the site list to the client application and store the site list in the site list cache (if implemented)

End

APPLICATION INTEGRATION SYSTEM AND METHOD

BACKGROUND

Cloud-based services and applications provide computing services over the Internet or a dedicated network. These services may include messaging, email, calendars, task monitoring, online storage, content generation, games, banking, shopping, and other types of software as a service. Some cloud-based services provide multiple related services/applications to provide users with a comprehensive experience within the same environment, or context. In addition, some cloud-based services enable the functionality of a service or suit of services to be extended or enhanced through the integration external applications, also referred to as "apps" or "web apps." App integration is typically tightly controlled in order to ensure data isolation between users and to prevent data theft and website and data corruption.

Web apps are often integrated into an application through the use of iFrames. An iFrame is an HTML element that enables a web page to be embedded into an HTML document. IFrames enable apps to be integrated into a host application in a relatively easy manner. An iFrame includes a frame and has a 'src' attribute that is used to specify the Uniform Resource Locator (URL) of the web app which is to occupy the frame. This type of integration gives full access to the data/functionality of the web app within the client application. However, care must be taken to ensure that the iFrame source is a valid web page for the web app. A cloud-based platform may provide software development kits (SDKs) that enable apps to access data and/or functionality of the platform as well as to grant access to the platform by providing, for example, authentication tokens to users. If an iFrame were to load a web page associated with a malicious actor, the malicious actor could be granted an authentication token to the platform (via an SDK) which could be used for nefarious purposes.

While ensuring that iFrames for a web app always point to a valid web page associated with the web app is an important means of providing security to users of a cloud-based application or service, validating iFrame sources in this context poses challenges to application performance. Validating an iFrame for a web app typically requires that the starting web page for web app be retrieved in order to verify that source (src) of the iFrame is correct. Some web apps can have a number of different valid domains which can be used to access the web app. Therefore, the valid domains for a web app must also be retrieved in order to validate the iFrame source.

Previously known app integration processes typically required separate processes to retrieve the start URL and valid domains for a web app. For example, the start URL for a web app was retrieved by making an application programming interface (API) call during a boot process of the client application. The API call was only capable of retrieving the start URL. In order to retrieve the valid domains (in addition to the start URL) for the web app in this manner, previously known app integration processes would have to perform another API call to retrieve the valid domains. However, introducing a separate API call to enable the valid domains for a web app to be fetched would negatively impact boot performance of the client application. Since boot time is an important factor in user satisfaction with an application, introducing separate API calls during the boot process are typically avoided if possible.

As a result, previously known app integration processes would typically fetch valid domains for a web app at launch time of the web app (e.g., when the app is clicked in within a user interface). Fetching valid domains at launch time requires making network calls to online services to request the valid domains for a web app. The network calls used to request and return the valid domains for a web app are blocking calls meaning that IFrame construction is blocked until the valid domains can be retrieved. Retrieving valid domains for a web app at launch time therefore introduces latency into iFrame construction which can delay the load time of the app.

Hence, what is needed are systems and methods for integrating web apps into cloud-based applications that do not introduce latency into iFrame construction and web app load times and that do not adversely impact boot performance of the host application.

SUMMARY

In one general aspect, the instant disclosure presents a data processing system having a processor and a memory in communication with the processor wherein the memory stores executable instructions that, when executed by the processor alone or in combination with other processors, cause the data processing system to perform multiple functions. The functions include receiving a call to a first application programming interface (API) at a collaboration and communication service from a client application during a boot process for the client application, the first API call passing a predefined property indicating that a web uniform resource locator (URL) and valid domains for a tenancy are being requested, the tenancy corresponding to a web app integrated into the cloud-based collaboration and communication application; generating a call to a second API for a content and information management service during the boot process of the client application, the call to the second API requesting site collection information for the tenancy, the site collection information including the web URL of a root site of the tenancy and valid domains for each instance of the tenancy; receiving the site collection information from the content and information management service at the collaboration and communication service; generating a site list for the tenancy using the collaboration and communication service, a first site in the site list being the web URL of the root site and remaining sites in the site list being the valid domains for each instance of the tenancy; and returning the site list to the client application during the boot process of the client application.

In yet another general aspect, the instant disclosure presents a method for integrating web applications (apps) into a cloud-based collaboration and communication application. The method includes generating an app manifest for a web app integrated into the cloud-based collaboration and communication application, the app manifest including a start uniform resource locator (URL) property for listing a start URL of the web app and a valid domains property for listing valid domains associated with the web URL, the start URL and the valid domains including monikers, the monikers being placeholders for name portions of the start URL and the valid domains such that actual values of the name portions of the start URL and the valid domains are initially omitted from the app manifest; during a boot process of a client application of the cloud-based collaboration and communication system, generating a call to a first application programming interface (API) to a collaboration and communication service, the first API call passing a predefined property indicating that a web URL and valid domains URLs for the tenancy are being requested; receiving a site list for the tenancy from the collaboration and communication service during the boot process of the client application, a first site in the site list corresponding to a URL of a root site of the tenancy and remainder of sites corresponding to the valid domain URLs for the tenancy; and replacing the moniker in the start URL listed in the app manifest with a name portion of the URL of the root site from the first site in the site list and replacing the monikers in the valid domains listed in the app manifest with name portions of valid domain URLs from the remainder of the sites in the site list.

In a further general aspect, the instant application describes a non-transitory computer readable medium on which are stored instructions that when executed cause a programmable device to perform functions of receiving a call to a first application programming interface (API) at a collaboration and communication service from a client application during a boot process for the client application, the first API call passing a predefined property indicating that a web uniform resource locator (URL) and valid domains for a tenancy are being requested, the tenancy corresponding to a web app integrated into a cloud-based collaboration and communication application; generating a call to a second API for a content and information management service during the boot process of the client application, the call to the second API requesting site collection information for the tenancy, the site collection information including the web URL of a root site of the tenancy and valid domains for each instance of the tenancy; receiving the site collection information from the content and information management service at the collaboration and communication service; generating a site list for the tenancy using the collaboration and communication service, a first site in the site list being the web URL of the root site and remaining sites in the site list being the valid domains for each instance of the tenancy; and returning the site list to the client application during the boot process of the client application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 is a flow diagram depicting an example method for generating a site list for use in iFrame construction for the collaboration and communication application of FIG. 2.

DETAILED DESCRIPTION

Figure 1:
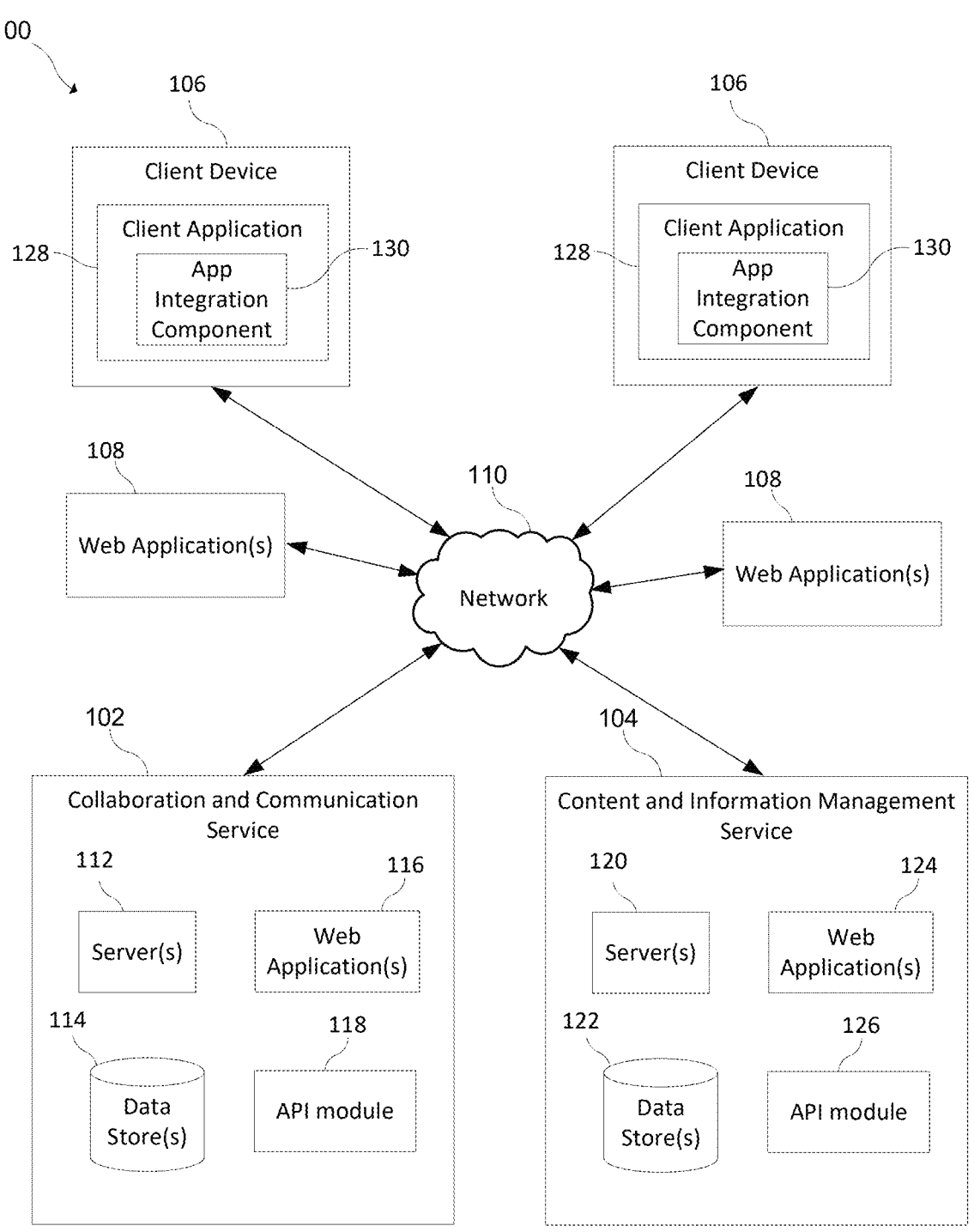
FIG. 1 depicts an example computing environment upon which aspects of this disclosure may be implemented.

Web apps can be integrated into cloud-based applications through the use of iFrames. An iFrame is an HTML element that enables a web page to be embedded into an HTML document. An iFrame includes a frame and has a 'src' attribute that is used to specify the URL of the web app which is to occupy the frame. This type of integration gives full access to the data/functionality of the web app within the client application. However, for security reasons, care must be taken to ensure that the iFrame source is a valid web page for the web app.

Web app integration is enabled in part through the use of predefined app manifests. An app manifest is a configuration file that provides essential metadata about a web application, such as its name, icon(s), start URL, display mode, and theme colors. The start URL (also referred to herein as the web URL, or webURL) is the URL that is to be loaded when the app is first launched. The app manifest for a web app also includes a field for valid domains. The app manifest for a web app must identify the web URL (i.e., start URL) for the web app. However, the web URL for a web app may not be known at the time the app manifest and/or web app is created. The account for this, app manifests are allowed to use predefined monikers (e.g., teamSiteDomain, sharepointSiteDomain, and the like) as placeholders in properties, such as the web URL property, of the manifests. The moniker must be replaced by the actual values/strings used in the web URL before the iFrame construction can be completed.

The data needed to resolve the moniker, such as the web URL, is typically fetched during the boot process of the host application by making an API call to an online service. In previously known implementations, the web URL for a root site was retrieved by passing a predetermined property in a request header of a user policy API call, such as the user aggregated settings policy API (i.e., UserAggregatedSettings API). An example implementation of such an API call is as follows:

API: /api/mt/part/dogfood/beta/users/useraggregatesettings

Request:tenantSite Url:true

Response:tenantSiteUrl:{value:{webUrl:{host}/_layouts/15/sharepoint.aspx}}

In this example, the API call utilizes the property "tenantSiteUrl:true" to instruct the online service to retrieve the web URL of s root site. The online service retrieves the web URL and returns the web URL to the host application. After the boot process has been completed, when a user clicks on a web app in the host application, the value of the web URL (i.e., the host field in the Response) is used to replace the moniker (e.g., teamSiteDomain) in the web URL property for the web app. In various implementations, the system includes a moniker model for resolving the moniker and generating the web URLs and vanity URLs with the appropriate scheme, subdomain, domain, etc. The moniker model may comprise any suitable type of machine learning (ML)

model, artificial intelligence (AI) model, computer algorithm, or the like capable of resolving monikers and generating URLs.

In previously known app integration processes, valid domains were typically fetched during a separate process (from the web URL) at the time a web app was launched (e.g., when a user clicked on an app icon in the host application). Fetching valid domains in this manner typically involved making asynchronous network from the host application to online services. The asynchronous network calls to fetch these domains are blocking calls meaning that iFrame construction is blocked until the valid domains can be retrieved so the source for the iFrame can be validated. Retrieving valid domains for a web app at launch time introduces latency into iFrame construction and, in turn, web app load time which is a technical problem. Another method of fetching valid domains for a web app involves introducing another API call during the boot process of the host application to request the valid domains for a web app in conjunction with requesting the web URL. However, the separate API call would increase the boot time for the host application which is also a technical problem. Such an increase in boot time can adversely impact customer experience and satisfaction with the application.

To address the technical problems associated with integrating apps into cloud-based applications, this description provides technical solutions in the form of a domain prefetching process which enables both web URLs and valid domains (including multi-geographic domains and vanity domains) of web apps, or tenancies, to be retrieved without requiring the use of blocking network calls at web app launch time which introduce latency into iFrame construction and without requiring multiple API calls during the boot process of the client application which negatively impact boot performance. The domain prefetching process involves modifying an existing API call used to retrieve the web URL to enable the call to retrieve both the web URL and valid domains. More specifically, the API call is modified to pass a new property (i.e., "tenantSiteUrlAndDomains":true) to an application service. The application service is programmed to make an API call, and in particular a graph call, to an online data management service to request site collection information pertaining to at least one tenancy associated with the application service. The site collection information includes the web URL and valid domain(s) for each instance of a tenancy. As used herein, a "tenancy instance" is a group of users who share a software instance with specific access and privileges. After the site collection information is generated, the application service performs an algorithm during the boot process of the host application (i.e., client application) to generate a site list for the tenancy. The algorithm involves determining the URL of the root site for the tenancy and generating a blank site list for the tenancy. The valid domains for each tenant instance are then fetched and appended to the site list. Each domain in the site list is then checked to see if the domain matches the URL of the root site. If the domain matches the URL of the root site, the domain is added to the beginning of the list.

This results in a site list that includes the URL of the root site as the first entry in the list and valid domains as the remainder of the list. The site list is returned to the host application where it can be used in resolving the moniker of the web app and in validating the sources of iFrames. For example, a client application can be programmed to know that the first entry is the root site and to use the first entry to resolve the web URL of the tenancy, e.g., by replacing the moniker for the tenant in the web URL of the root site associated with the tenant. In addition, when the web app is launched in the client application, the client application does not have to request the valid domains from the online service as the domains are already included in the site list. Therefore, the latency for verifying the source of an iFrame for a web app when launched is reduced relative to previously known processes.

FIG. 1 illustrates an example computing environment 100 upon which aspects of the disclosure are implemented. Computing environment 100 includes a collaboration and communication service 102, a content and information management service 104, client devices 106, and web applications 108 which communicate with each other via a network 110. The network 110 includes one or more wired, wireless, and/or a combination of wired and wireless networks. The network 110 may include one or more local area networks (LAN), wide area networks (WAN) (e.g., the Internet), public networks, private networks, virtual networks, mesh networks, peer-to-peer networks, and/or other interconnected data paths across which multiple devices may communicate. In embodiments, the network 110 is coupled to or includes portions of a telecommunications network for sending data in a variety of different communication protocols. In some implementations, the network 110 includes Bluetooth® communication networks or a cellular communications network for sending and receiving data including via short messaging service (SMS), multimedia messaging service (MMS), hypertext transfer protocol (HTTP), direct data connection, WAP, email, and the like.

The collaboration and communication service 102 provides various tools and features for facilitating collaboration and communication between users. For example, in various implementations, the collaboration and communication service 102 provides chat and messaging functionality, video and audio calling, screen sharing, file sharing, document collaboration and co-authoring, third-party app integration, security features, and/or the like. To this end, the collaboration and communication service 102 includes at least one server 112 which is configured to provide computational and/or storage resources for implementing the collaboration and communication service 102. The server 112 is representative of any physical or virtual computing system, device, or collection thereof, such as, a web server, rack server, blade server, virtual machine server, or tower server, as well as any other type of computing system. In various implementations, the server 112 is implemented in a data center, a virtual data center, or some other suitable facility. Server 112 executes one or more software applications, modules, components, or collection thereof capable of providing the messaging service to clients, such as client devices 106. In various implementations, server 112 hosts data and/or content in connection with the collaboration and communication service 102 and makes this data and/or content available to the users of client devices 106 via the network 110. Program code, instructions, user data and/or content for the collaboration and communication service 102 is stored in a data store 114.

In various implementations, the collaboration and communication service 102 includes one or more web applications 116 which enable the functionality of the service 102 to be accessed via a web browser. The collaboration and communication service 102 includes an application programming interface (API) module 118 that defines one or more APIs via which client applications 128 can communicate with the collaboration and communication service 102. An API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture. APIs enable client applications 128 to access and use one or more functions, methods, procedures, data structures, classes, and/or other services provided by the service 102.

The content and information management service 104 provides cloud-based tools for the collaboration and communication service 102 that facilitate storing, organizing, sharing, and managing content, such as documents for storing content (e.g., documents, web sites, files, multimedia assets, etc.) and information (e.g., data, records, metadata pertaining to content, etc.). The content and information management service 104 also provides web hosting, file sharing, and content publishing capabilities. The content and information management service 104 includes at least one server 120 which is configured to provide computational and/or storage resources for implementing the content and information management service 104. Program code, instructions, user data and/or content for the content and information management service 104 is stored in a data store 122. Although the collaboration and communication service 102 and the content and information management service 104 are each shown as having a single server and data store, these services may utilize any suitable number of servers and/or data stores. In various implementations, the content and information management service 104 includes one or more web applications 124 which enable the functionality of the service 104 to be accessed via a web browser. The content and information management service 104 includes an application programming interface (API) module 126 that defines one or more APIs via which the collaboration and communication service 102 can communicate with and access the functionality provided by the content and information management service 104.

Client devices 106 enable users to access and interact with the collaboration and communication service 102. Client devices 106 can be implemented using any suitable type of computing device, such as personal computers, desktop computers, laptop computers, mobile telephones, smart phones, tablets, phablets, smart watches, wearable computers, gaming devices/computers, televisions, and the like. Each client device 106 includes at least one client application 128 for interacting with the collaboration and communication service 102. In some implementations, the client application 128 is a local application that is capable of accessing the functionality of the collaboration and communication service 102. In other implementations, the client application 128 is a web browser that enables access to web-based application(s) implemented by the collaboration and communication service 102.

Web applications 108 are software applications which are run on remote servers and are accessed via a web browser over the Internet. Examples of web applications include content creating/editing applications (e.g., word processors, presentation applications, etc.), productivity applications (e.g., calendar, task management, etc.), communication applications (e.g., messaging, email, chat, etc.), online shopping, social networking, banking, and the like. A web application can be any website that performs tasks and actions or provides services beyond just serving static information.

The collaboration and communication service 102 enables first party and third party applications web applications (also referred to as "web apps") to be integrated into the system so they are accessible via client applications 128. To this end, the client applications 128 include an app integration component 130 for managing the integration of web apps in the client application. First party web apps associated with a tenant refer to web apps which are developed by the tenant. Third party web apps are web apps which are created and maintained by a third party, such as web applications 108. Web apps can be integrated to provide organizational specific features, add/enhance functionality, provide access to data, perform tasks, and the like.

Each web app is typically associated with a tenant of the collaboration and communication service 102. A tenant corresponds to a dedicated instance of the services provided by the collaboration and communication service 102. Each tenant has a top-level site, or root site, that is created when a web app is integrated into the system. The root site often has a tenant name as part of the URL. For example, a root site for a tenant named "Smith" with a collaboration and communication service called, e.g., "ccs" could be "smith.ccs.com".

Web applications are integrated into client applications through the use of an inline frame ("iFrame"). An iFrame is an HTML element that represents a nested browsing context in which a document, such as an HTML page or, in this case, a web app, is embedded within another HTML element. An iFrame includes a frame and has a 'src' attribute that is used to specify the Uniform Resource Locator (URL) of the document which is to occupy the frame. For the purposes of the collaboration and communication service 102, the iFrame utilizes the URL of a web app as a source to integrate the web app into the client application. This type of integration gives full access to the data/functionality of the web app within the client application. The app integration component 130 facilitates the integration of web apps by constructing iFrames and communicating with the collaboration and communication service 102 to retrieve URLs and domains for web apps which are to be loaded into iFrames.

Together, client applications 128, collaboration and communication service 102, and content and information management service 104 form a collaboration and communication system having a multi-tier architecture that organizes the functionality of the system into three logical and physical computing tiers: (1) a presentation tier (e.g., client) which provides a user interface for interacting with the service, (2) a data management tier for storing, retrieving, and managing data for the service, and (3) an application/service tier (also referred to as a middle tier) for processing client requests and coordinating interactions between the presentation tier (client) and the data management layer. The client applications 128 implement the presentation tier, the content and information management service 104 implements the data management tier, and the collaboration and communication service 102 implements the application/service tier (i.e., middle tier).

Figure 2:
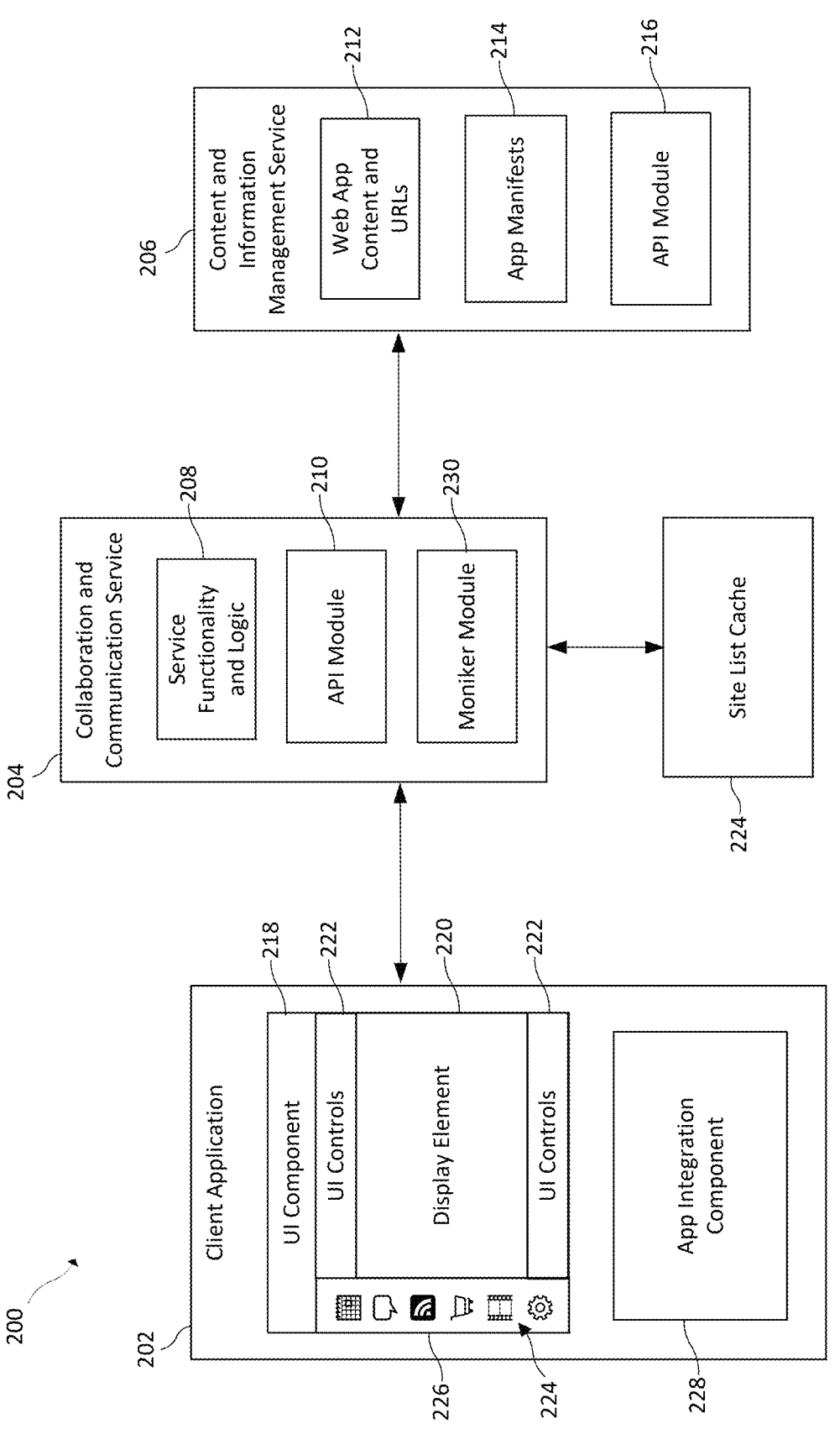
FIG. 2 depicts an example implementation of the collaboration and communication application of FIG. 1.

An example implementation of a multi-tier collaboration and communication system 200 is shown in FIG. 2. The system 200 includes a client application 202 as the presentation tier, a collaboration and communication service 204 as the application/service tier, and a content and information management service 206 as the data management tier. Similar to FIG. 1, the collaboration and communication service 204 includes service functionality and logic 208 which enable the implementation of various collaboration and communication functions, such as chat and messaging, video and audio calling, screen sharing, file sharing, document collaboration and co-authoring, third-party app integration, security features, and/or the like, which are accessible via the client application 202. The collaboration and communication service 204 also includes an API module 210 that defines one or more APIs via which the client application 202 can communicate with and access the functionality provided by the collaboration and communication service 204. Because the collaboration and communication service 204 implements the application/service tier of the system architecture, the collaboration and communication service 204 handles the system's core processing, business rules, and calculations, and also isolates the client application from direct access to the back-end data.

The content and information management service 206 provides tools that facilitate storing, organizing, sharing, and managing content and information for the collaboration and communication system 200. As shown in FIG. 2, the content and information management service 206 stores and controls access to web app content 212 for web apps which are integrated into the collaboration and communication system 200. Web app integration is enabled in part through the use of predefined app manifests. An app manifest is a configuration file that provides essential metadata about a web application, such as its name, icon(s), start URL, display mode, and theme colors. The start URL (also referred to herein as the web URL, or webURL) is the URL that is to be loaded when the app is first launched. Content and information management service 206 stores and controls access to app manifests 214 for the web apps which are integrated into the collaboration and communication system 200. The content and information management service 206 also includes an API module 216 that defines one or more APIs via which the collaboration and communication service 204 can communicate with and access the functionality provided by the content and information management service 206.

For security reasons, the app manifest for a web app also includes a field for valid domains. These are the domains that the system allows to be opened within the iFrame that is constructed for the app. Valid domains can include tenant domains, vanity domains, and multi-geographic domains. A website for a vanity domain is identified by a unique URL that typically includes a user selected name, but that does not include a name of the root domain. For example, a URL for a non-vanity domain may include the string "company_x.sharepoint.com," where "sharepoint" is an example root domain of the document and information sharing system 106 and "company_x" is a sub-domain. Another example URL for a non-vanity domain may include the string "company_y.sharepoint.com," where "sharepoint" is the root domain and "company_y" is a sub-domain. In contrast, URLs for vanity domains may include the strings "company_x.com" and "company_y.com". For the vanity domains, the example root domain "sharepoint" is not included in the URL.

The app manifest for a web app must identify the web URL (i.e., start URL) for the web app. However, the web URL for a web app may not be known at the time the app manifest and/or web app is created. The account for this, app manifests are allowed to use predefined monikers (e.g., teamSiteDomain, sharepointSiteDomain, and the like) as placeholders in properties, such as the web URL property, of the manifests. The moniker is typically used as a placeholder for the name portion of the URL. The moniker will be replaced at run-time by the actual values/strings from the corresponding portion (e.g., name portion) of the web URL. The data needed to resolve the moniker is fetched from the content and information management service during the boot process of the client application. To accomplish this, the app integration component 228 generates an API call to the collaboration and communication service which instructs the collaboration and communication service to make a network call to the content and information management service to fetch the web URL of the root site.

In various implementations, the collaboration and communication service 204 and/or the client application 202 include a moniker module 230 for resolving monikers and generating valid web URLs and vanity URLs with the appropriate scheme, subdomain, domain, etc. based on the resolved monikers. In some implementations, the moniker module includes a moniker model for generating the URLs by generating web URLs and vanity URLs and replacing monikers with the appropriate names. The moniker model may comprise any suitable type of machine learning (ML) model, artificial intelligence (AI) model, computer algorithm, or the like capable of resolving monikers and generating URLs. The retrieved web URL is then returned to the client application where it is used to replace the moniker in the web URL property of the app manifest.

In previously known app integration processes, valid domains were typically fetched during a separate process at the time a web app was launched (e.g., when a user clicked on an app icon in the client application). Fetching valid domains in this manner typically involved making asynchronous network from the client application to the collaboration and communication service and from the collaboration and communication service to the content and information management service. The asynchronous network calls to fetch these domains are blocking calls meaning that iFrame construction is blocked until the valid domains can be retrieved so the source for the iFrame can be validated. Retrieving valid domains for a web app at launch time introduces latency into iFrame construction and, in turn, web app load time. Another method of fetching valid domains for a web app involves introducing another API call, or graph call, during the boot process of the client application to request the valid domains for web apps. However, modifying previously known app integration processes to retrieve valid domains during the boot process of the client application would require a separate graph call to retrieve the valid domains. The separate graph call would increase the boot time for the application. Such an increase in boot time can adversely impact customer experience and satisfaction with the application.

To address the technical problems associated with previously known web app integration processes, the collaboration and communication system is configured to perform a domain prefetching process which enables both web URLs and valid domains (including multi-geographic domains and vanity domains) of tenancies to be retrieved without requiring the use of blocking network calls at web app launch time which introduce latency into iFrame construction and without requiring multiple API calls during the boot process of the client application which negatively impact boot performance. The domain prefetching process involves modifying the existing API call used to pass a property to the collaboration and communication service in the Request header of an API call to the UserAggregatedSettings API. The API call is modified by replacing the property used to retrieve the web URL of a web app (i.e., "tenantSiteUrl":true) with a new property (i.e., "tenantSiteUrlAndDomains": true) which is used to instruct the collaboration and communication service to retrieve the web URL and the valid domains for a web app form the content and information management service. An example of the API call is as follows:

```
API: /api/mt/part/dogfood/beta/users/useraggregatesettings
Request Header {
    TenantSiteUrlAndDomains : True
}
```

The collaboration and communication service 204 is provided with functionality and/or logic 208 which enables the collaboration and communication service to identify when the property "TenantSiteUrlAndDomains:true" is being passed in the Request header of a UserAggregateSettings API call. In response to receiving the predefined property, the collaboration and communication service 204 generates a request for the web URL and valid domains that is sent to the content and information management service 206. In some implementations, the request involves making an API call to the content and information management service 206. For example, the API call may comprise a graph call such as follows: https://graph.microsoft.com/v1.0/sites/root?filter=siteCollection/root&select=weburl,siteCollection. The response to the call returns both the web URL and the valid domains associated with each instance of a tenancy for the collaboration and communication service 204.

The collaboration and communication service returns the web URL and the valid domains to the client application 202. In various implementations, the system 200 includes a site list cache 224 for storing site lists returned by the content and information management service 206. In some implementations, the site list cache 224 comprises a distributed cache system. The distributed cache system may be implemented a by Remote Dictionary Server (Redis). Redis is an open-source, in memory, key-value data store that may be used to implement a database, a hash, or other types of data store. Redis provides a faster response time than databases that store data on a disk or solid-state drive, because the Redis data all resides in memory. In various implementations, the site list cache is updated at a predetermined frequency, e.g., once a week, once a month, once every 60 days, or the like. The use of a cache further optimizes the system by reducing the computing resources and network bandwidth required to retrieve web URL and valid domain information for a tenancy.

Figure 3:
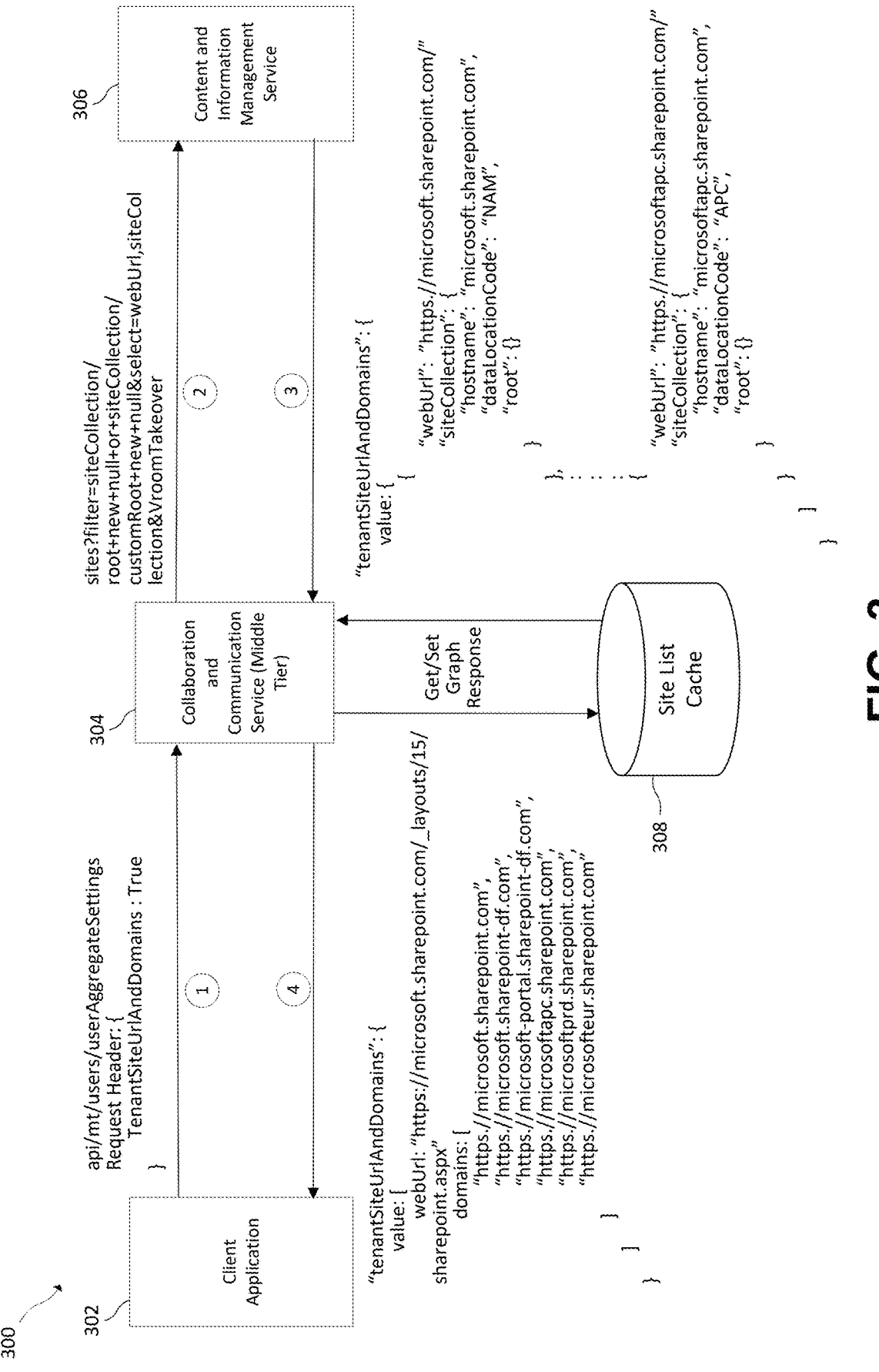
FIG. 3 depicts a multi-tier architecture and communication flow for the collaboration and communication system of FIG. 2.

FIG. 3 shows an example implementation of a collaboration and communication system showing the multi-tier architecture and showing examples of the communication flow used to retrieve the web URL and valid domains during the prefetch process according to this disclosure. The example system of FIG. 3 includes a client application 302 (i.e., presentation tier), a collaboration and communication service 304 (application/service tier), content and information management service 306, and a file list cache 308. During the boot process of the client application, the client application 302 sends an API call ① to the collaboration and communication service 304. For example, the API call, such as shown above, in which the property "TenantSiteUrlAndDomains:True" is passed in the Request Header to the UserAggregatedSettings API.

In response to receiving the API call, the collaboration and communication service 304 then generates a message ② to the content and information management service 306 that requests the web URL and valid domains associated with each tenant of the collaboration and communication service. The message may include an API call, such as a graph call, to the API of the collaboration and communication service. In the example of FIG. 3, the message ② comprises a graph call to retrieve a list of sites (i.e., siteCollection) associated with a tenancy. The content and information management service 306 generates a response ③ to the collaboration and communication service 304 that includes the web URL and site list (i.e., siteCollection) associated with a tenancy. The collaboration and communication service 304 processes the response ③ to generate a site list ④ that includes a list of the web URL and valid domains associated with a tenancy. The site list ④ is then returned to the client application. In some implementations, the response ③ is forwarded to the client application, and the client application processes the response ③ to generate the site list ④.

The system includes a site list cache 308 (e.g., REDIS cache) which may be used to cache site lists which have been generated for the client application 302. When the collaboration and communication service 304 receives the API call ①, the collaboration and communication service 304 first checks the cache 308 to see if a current (i.e., not expired) site list has been cached for the client application. For example, the collaboration and communication service 304 can send a message to the site list cache 308 to get site list information for the client application. In implementations, the message may comprise a get graph call to the site list cache 308. Cached site list data can be considered current or fresh for a predetermined amount of time, e.g., 1 day, 1 week, 1 month, etc. If there is not current site list in the cache for the client application, the collaboration and communication service 304 generates the message ② to the content and information management service 306 that requests the web URL and valid domains associated with each tenant of the collaboration and communication service. Each site list that is generated based on the information received from the content and information management service 306 may be stored in the site list cache 308. For example, the collaboration and communication service 304 may generate a set graph call to cause a site list to be stored in the site list cache 308.

If there is a current site list in the cache for the client application, the collaboration and communication service 304 retrieves the site list from the cache 308 and delivers the site list to the client application without having to send the message ② to the content and information management service 306. Caching site lists in this manner reduces the amount of computing resources and network bandwidth that would otherwise be required to generate the site list. It also reduces the number of network calls required for generating site lists which can reduce the stress on the content and information management service 306 and prevent the content and information management service 306 from throttling the collaboration and communication service 304.

The collaboration and communication service 304 and/or the content and information management service 306 are configured to implement an algorithm for processing the output of the content and information management service 306 to generate the site list that is returned to the client application. An example implementation of the algorithm is shown in FIG. 4. The algorithm begins with retrieving the root site of a tenancy using the current context and the URL for the root site during the boot process of the client application (block 402). The URL is formatted, e.g., by removing trailing slashes) and an empty list, called "sites" for example, is then created (block 404). A list of all tenant instances is then determined (block 406). For each tenant instance, the valid domains (multi-geo and vanity) are fetched for the tenant instance and appended to the site list (block 408). The site list is looped through starting with the second site to check if the URL of the site matches the URL of the root site (block 410). If the URL of a site matches the URL of the root site, the site is removed from the list and added to the beginning of the list (block 412). The site list is then returned to the client application and stored in a site list cache (if the cache is implemented) (block 414).

In this way a site list is generated that includes the URL of the root site as the first entry in the list and valid domains as the remainder of the list. The client application is programmed to know that the first entry is the root site and to use the first entry to resolve the web URL of the tenancy, e.g., by replacing the moniker for the tenant in the web URL of the root site associated with the tenant. In addition, when the web app is launched in the client application, the client application does not have to request the valid domains from the collaboration and communication service as the domains are already included in the site list. Therefore, the latency for verifying the source of an iFrame for a web app when launched is reduced relative to previously known processes.

Figure 5:
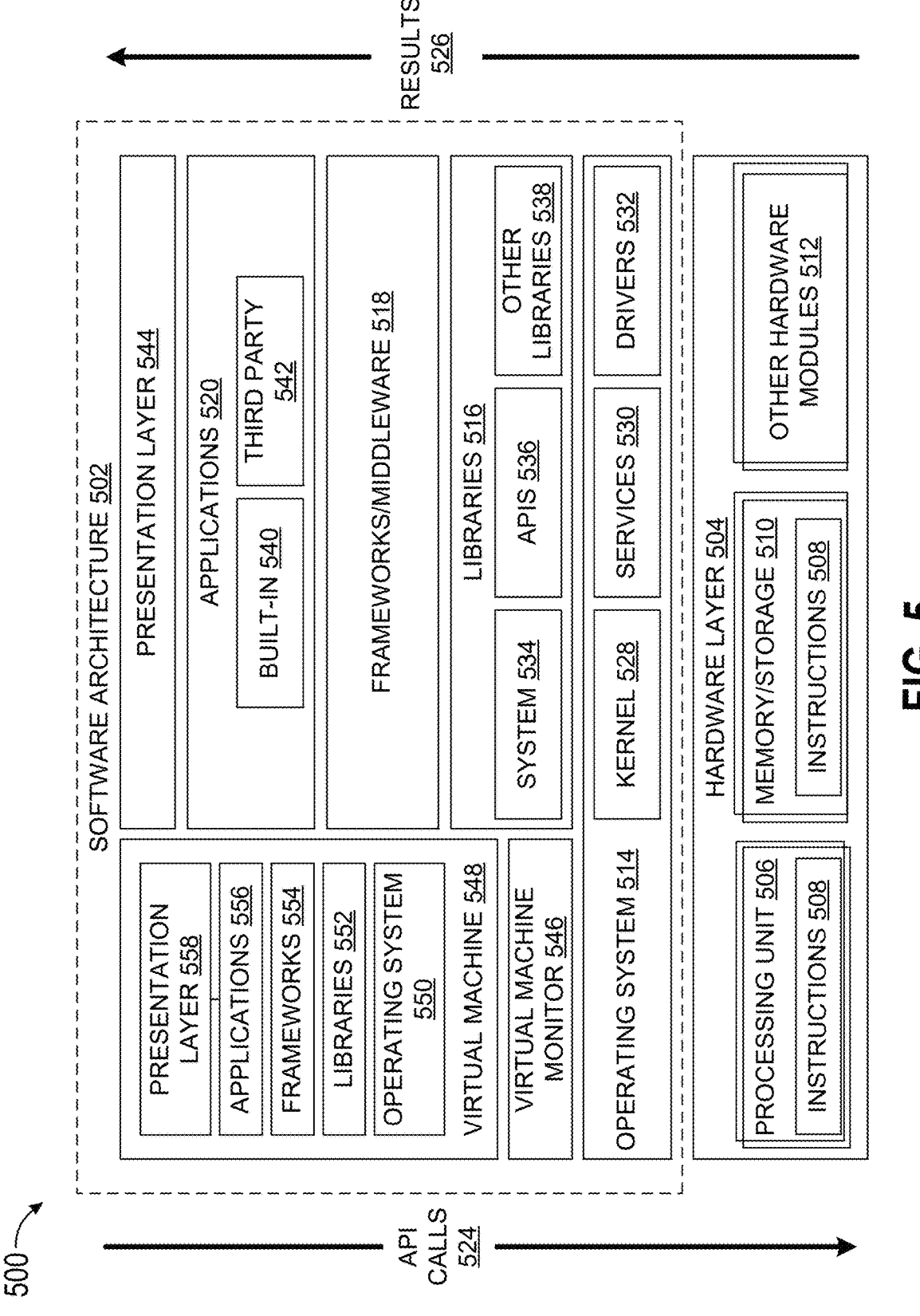
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
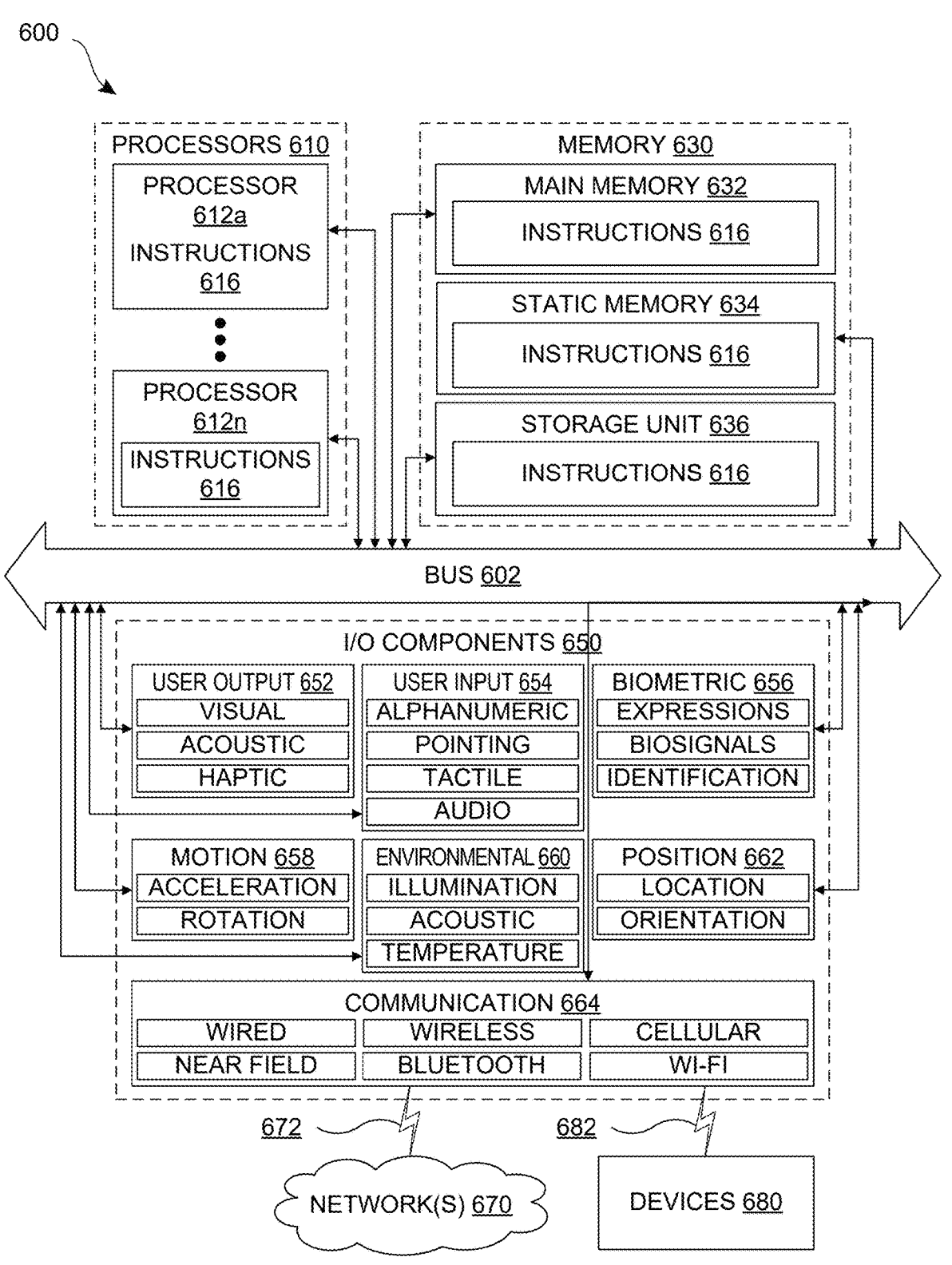
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system for a cloud-based collaboration and communication application, the data processing system comprising:

a processor; and a memory in communication with the processor, the memory comprising executable instructions that, when executed by the processor alone or in combination with other processors, cause the data processing system to perform functions of:

receiving a call to a first application programming interface (API) at a collaboration and communication service from a client application during a boot process for the client application, the first API call passing a predefined property indicating that a web uniform resource locator (URL) and valid domains for a tenancy are being requested, the tenancy corresponding to a web app integrated into the cloud-based collaboration and communication application;

generating a call to a second API for a content and information management service during the boot process of the client application, the call to the second API requesting site collection information for the tenancy, the site collection information including the web URL of a root site of the tenancy and valid domains for each instance of the tenancy;

receiving the site collection information from the content and information management service at the collaboration and communication service;

generating a site list for the tenancy using the collaboration and communication service, a first site in the site list being the web URL of the root site and remaining sites in the site list being the valid domains for each instance of the tenancy; and returning the site list to the client application during the boot process of the client application.

2. The data processing system of claim 1, wherein generating the site list further comprises:

creating the site list such that the site list is initially empty;

appending the valid domains for each instance of the tenancy from the site collection information to the site list;

comparing each of the valid domains in the site list to the web URL of the root site; and in response to a valid domain matching the web URL of the root site, moving the valid domain to the first site in the site list.

3. The data processing system of claim 1, wherein the call to the first API comprises a call to a user aggregated setting policy API, the call to the user aggregated setting policy API including a request header, the predefined property being passed in the request header.

4. The data processing system of claim 1, wherein the functions further comprise:

storing the site list in a site list cache for the collaboration and communication service.

5. The data processing system of claim 4, wherein the functions further comprise:

after receiving the call to the first application programming interface (API) at the collaboration and communication service, checking to see if the site list is available in the site list cache before generating the call to the second API for the content and information management service; and in response to the site list being available in the site list cache, retrieving the site list from the site list cache and returning the site list to the client application without generating the call to the second API for the content and information management service.

6. The data processing system of claim 3, wherein:

the content and information management service comprises a graph service that collects data pertaining to usage and performance of the cloud-based collaboration and communication application, and the call to the second API comprises a graph call requesting the site collection information.

7. The data processing system of claim 1, wherein:

the web app is defined at least in part by an app manifest, the app manifest including a start URL property, the start URL property being initially listed with a moniker in the app manifest, the moniker being a placeholder for a name portion of the start URL, the first site in the site list includes a name portion of the web URL of the root site; and the client application and/or the collaboration and communication service includes a moniker module that resolves the moniker and generates the start URL by replacing the moniker with the name portion of the web URL of the root site and generates valid domain URLs for the valid domains associated with the tenancy during the boot process of the client application.

8. The data processing system of claim 1, wherein:

in response to receiving user input causing the web app to be launched from within the client application, the client application retrieves a source attribute for an iFrame for the web app and the web URL and the valid domains from the site list for the tenancy associated with the web app, the client application compares a URL of the source attribute of the iFrame to the web URL and the valid domains from the site list, and in response to the URL of the source attribute of the iFrame matching one of the web URL and the valid domains from the site list, the client application constructs the iFrame and loads the URL of the source attribute in the iFrame.

9. A method for integrating web applications (apps) into a cloud-based collaboration and communication application, the method comprising:

generating an app manifest for a web app integrated into the cloud-based collaboration and communication application, the app manifest including a start uniform resource locator (URL) property for listing a start URL of the web app and a valid domains property for listing valid domains associated with the web URL, the start URL and the valid domains including monikers, the monikers being placeholders for name portions of the start URL and the valid domains such that actual values of the name portions of the start URL and the valid domains are initially omitted from the app manifest;

during a boot process of a client application of the cloud-based collaboration and communication system, generating a call to a first application programming interface (API) to a collaboration and communication service, the first API call passing a predefined property indicating that a web URL and valid domains URLs for the tenancy are being requested;

receiving a site list for the tenancy from the collaboration and communication service during the boot process of the client application, a first site in the site list corresponding to a URL of a root site of the tenancy and remainder of sites corresponding to the valid domain URLs for the tenancy; and replacing the moniker in the start URL listed in the app manifest with a name portion of the URL of the root site from the first site in the site list and replacing the monikers in the valid domains listed in the app manifest with name portions of valid domain URLs from the remainder of the sites in the site list.

10. The method of claim 9, the method further comprises:

in response to receiving user input causing the web app to be launched from within the client application, retrieving a source attribute for an iFrame for the web app and retrieving the web URL and the valid domains from the site list for the tenancy associated with the web app, comparing the URL of the source attribute of the iFrame to the web URL and the valid domains from the site list, and in response to the URL of the source attribute of the iFrame matching one of the web URL and the valid domains from the site list, constructing the iFrame and loading the URL of the source attribute in the iFrame.

11. The method of claim 9, further comprising:

generating a call to a second API for a content and information management service during the boot process of the client application, the call to the second API requesting site collection information for the tenancy, the site collection information including the web URL of the root site of the tenancy and valid domains for each instance of the tenancy;

receiving the site collection information from the content and information management service; and generating the site list for the tenancy using the site collection information, a first site in the site list being the web URL of the root site and remaining sites in the site list being the valid domains for each instance of the tenancy.

12. The method of claim 11, wherein generating the site list further comprises:

creating the site list such that the site list is initially empty;

appending the valid domains for each instance of the tenancy from the site collection information to the site list;

comparing each of the valid domains in the site list to the web URL of the root site; and in response to a valid domain matching the web URL of the root site, moving the valid domain to the first site in the site list.

13. The method of claim 12, wherein the call to the first API comprises a call to a user aggregated setting policy API, the call to the user aggregated setting policy API including a request header, the predefined property being passed in the request header.

14. The method of claim 9 further comprising:

storing the site list in a site list cache for the collaboration and communication service;

after receiving the call to the first application programming interface (API) at the collaboration and communication service, checking to see if the site list is available in the site list cache before generating the call to the second API for the content and information management service; and in response to the site list being available in the site list cache, retrieving the site list from the site list cache and returning the site list to the client application without generating the call to the second API for the content and information management service.

15. The method of claim 11, wherein:

the content and information management service comprises a graph service that collects data pertaining to usage and performance of the cloud-based collaboration and communication application, and the call to the second API comprises a graph call requesting the site collection information.

16. A non-transitory computer readable medium on which are stored instructions that, when executed, cause a programmable device to perform functions of:

receiving a call to a first application programming interface (API) at a collaboration and communication service from a client application during a boot process for the client application, the first API call passing a predefined property indicating that a web uniform resource locator (URL) and valid domains for a tenancy are being requested, the tenancy corresponding to a web app integrated into a cloud-based collaboration and communication application;

generating a call to a second API for a content and information management service during the boot process of the client application, the call to the second API requesting site collection information for the tenancy, the site collection information including the web URL of a root site of the tenancy and valid domains for each instance of the tenancy;

receiving the site collection information from the content and information management service at the collaboration and communication service;

generating a site list for the tenancy using the collaboration and communication service, a first site in the site list being the web URL of the root site and remaining sites in the site list being the valid domains for each instance of the tenancy; and returning the site list to the client application during the boot process of the client application.

17. The non-transitory computer readable medium of claim 16, wherein generating the site list further comprises:

creating the site list such that the site list is initially empty;

appending the valid domains for each instance of the tenancy from the site collection information to the site list;

comparing each of the valid domains in the site list to the web URL of the root site; and in response to a valid domain matching the web URL of the root site, moving the valid domain to the first site in the site list.

18. The non-transitory computer readable medium of claim 16, wherein the call to the first API comprises a call to a user aggregated setting policy API, the call to the user aggregated setting policy API including a request header, the predefined property being passed in the request header.

19. The non-transitory computer readable medium of claim 16, wherein:

the web app is defined at least in part by an app manifest, the app manifest including a start URL property, the start URL property being initially listed with a moniker in the app manifest, the moniker being a placeholder for a name portion of the start URL, the first site in the site list includes a name portion of the web URL of the root site; and the client application replaces the moniker with the name portion of the web URL of the root site during the boot process of the client application.

20. The non-transitory computer readable medium of claim 16, wherein:

in response to receiving user input causing the web app to be launched from within the client application, the client application retrieves a source attribute for an iFrame for the web app and the web URL and the valid domains from the site list for the tenancy associated with the web app, the client application compares a URL of the source attribute of the iFrame to the web URL and the valid domains from the site list, and in response to the URL of the source attribute of the iFrame matching one of the web URL and the valid domains from the site list, the client application constructs the iFrame and loads the URL of the source attribute in the iFrame.

* * * * *